United States Patent
Zhou

(10) Patent No.: US 8,614,775 B2
(45) Date of Patent: Dec. 24, 2013

(54) BACKLIGHT MODULE AND LIQUID CRYSTAL DISPLAY

(75) Inventor: Gege Zhou, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 77 days.

(21) Appl. No.: 13/379,862

(22) PCT Filed: Oct. 12, 2011

(86) PCT No.: PCT/CN2011/080676
§ 371 (c)(1),
(2), (4) Date: Dec. 21, 2011

(87) PCT Pub. No.: WO2013/033940
PCT Pub. Date: Mar. 14, 2013

(65) Prior Publication Data
US 2013/0063681 A1    Mar. 14, 2013

(30) Foreign Application Priority Data
Sep. 9, 2011 (CN) .......................... 2011 1 0267025

(51) Int. Cl.
*G02F 1/1335* (2006.01)

(52) U.S. Cl.
USPC ................. 349/64; 349/65; 362/606; 362/608

(58) Field of Classification Search
None
See application file for complete search history.

(56) References Cited

U.S. PATENT DOCUMENTS

| | | | |
|---|---|---|---|
| 2006/0279216 A1 | 12/2006 | Kim et al. | |
| 2008/0309847 A1* | 12/2008 | Aritake et al. | 349/64 |
| 2009/0034289 A1 | 2/2009 | Bu et al. | |
| 2009/0237585 A1* | 9/2009 | Kim | 349/58 |
| 2011/0317098 A1 | 12/2011 | Moon et al. | |

FOREIGN PATENT DOCUMENTS

| | | |
|---|---|---|
| CN | 1601353 A | 3/2005 |
| CN | 2802544 Y | 8/2006 |
| CN | 1881040 A | 12/2006 |
| CN | 101191957 A | 6/2008 |
| CN | 101358710 A | 2/2009 |
| CN | 101852363 A | 10/2010 |
| CN | 101963314 A | 2/2011 |
| CN | 201858541 U | 6/2011 |
| CN | 202152969 U | 2/2012 |
| JP | 2010079105 A | 4/2010 |

* cited by examiner

*Primary Examiner* — Richard Kim
(74) *Attorney, Agent, or Firm* — Ditthavong Mori & Steiner, P.C.

(57) ABSTRACT

A backlight module is disclosed, comprising a light guide plate and light sources, where the light guide plate comprises lateral incident faces, an exit face that joins the lateral incident faces, and an underside that corresponds to the exit face. The light sources each comprises an emitting surface, is disposed near one side of one lateral incident face of the light guide plate, and corresponds to the lateral incident face of the light guide plate with the emitting surface. The backlight module further comprises diffusion strips, where the diffusion strips each is disposed in between one lateral incident face of the light guide plate and the emitting surface of the light source, and the light rays emitted from the emitting surface of the light source pass the diffusion strip and diffuse into the light guide plate. This invention further discloses a liquid crystal display.

13 Claims, 4 Drawing Sheets

BACKLIGHT MODULE AND LIQUID CRYSTAL DISPLAY

FIELD OF THE INVENTION

The present invention relates to liquid crystal display technique, and more particularly to a backlight module and a liquid crystal display.

BACKGROUND OF THE INVENTION

With the advancement of liquid crystal display (LCD) techniques, the demand for the features of the liquid crystal display is getting higher.

A backlight module as an important integral portion of the liquid crystal display decides the frame quality of the liquid crystal display. Referring to FIG. 1A, in a conventional backlight module, a light bar 11 is disposed near one side of a lateral incident face 121 of a light guide plate 12. During the working of the backlight module, the light rays from the light bar 11 enter the light guide plate 12, and the light guide plate 12 transforms a spot light source of the light bar 11 into a planar light source to emit, for the realization of illumination of the backlight module.

Since the thickness of the liquid crystal display is constantly diminished, each part of the backlight module calls for thinner in thickness correspondingly, and a side frame calls for narrower in width correspondingly, which easily leads to bright spots at one side near the lateral incident face 121 of the light guide plate 12 as the light rays of the light bar 11 enter the light guide plate 12. Referring to FIG. 1B, the bright spots considerably affect the emission of the light rays of the backlight module, and further affect the frame quality of the liquid crystal display.

SUMMARY OF THE INVENTION

An objective of this invention is to provide a backlight module, to settle the technical problem of the bright spots that are easily brought about, as the light rays of a light bar near one side of the lateral incident face of a light guide plate enter the light guide plate, due to the backlight module getting thinner and the side frame becoming narrower.

To settle the aforementioned problem, the present invention provides a backlight module, comprising a light guide plate and a light source, where the light guide plate comprises a lateral incident face, an exit face that joins the lateral incident face, and an underside that corresponds to the exit face. The light source comprises an emitting surface, is disposed near one side of the lateral incident face of the light guide plate, and corresponds to the lateral incident face of the light guide plate with its emitting surface;

The backlight module further comprises a diffusion strip, where the diffusion strip is disposed in between a lateral incident face of the light guide plate and the emitting surface of a light source. And the diffusion strip is provided with through holes, where the locations of the through holes each corresponds to the location between adjacent light emitting diodes of the light source, and the light rays emitted from the emitting surface of the light source pass the through holes of the diffusion strip and diffuse into the light guide plate;

The backlight module further comprises a diffusion plate, where the diffusion plate is located on the light guide plate, the light guide plate and the diffusion plate are planar, and the diffusion plate is disposed directly on the light guide plate;

The diffusion strips connect to the diffusion plate and the diffusion strips and the diffusion plate are shaped into one piece, and the diffusion strips are formed by bending the two lateral ends of the diffusion plate downward followed by an extension.

In the backlight module of this invention, the longitudinal direction of the diffusion strip is perpendicular to the longitudinal direction of the light guide plate, and the diffusion strip is provided with at least two through holes, where the through holes are placed sequentially along the longitudinal direction of the diffusion strip.

In the backlight module of this invention, the backlight module further comprises fixation bars, where the fixation bars and the diffusion plate are located at top and bottom of the light guide plate respectively.

The fixation bars each joins the nearby diffusion strip and both are shaped into one piece, and the fixation bars are formed by bending the bottom ends of the diffusion strips inward horizontally followed by an extension.

In the backlight module of this invention, the longitudinal direction of the fixation bar is parallel to the longitudinal direction of the diffusion strip.

In the backlight module of this invention, the backlight module further comprises a reflective plate, where the reflective plate is disposed in between the light guide plate and the fixation bars.

In the backlight module of this invention, the backlight module further comprises an optical film, where the optical film is disposed in between the light guide plate and the diffusion plate.

In the backlight module of this invention, the backlight module further comprises a back bezel, a rubber frame and a front frame, and the light sources are disposed on the back bezel, where the back bezel connects supportively to the reflective plate, the rubber frame connects to the back bezel and the front frame connects to the rubber frame.

Another objective of this invention is to provide a backlight module, to settle the technical problem of the bright spots that are easily brought about, as the light rays of a light bar near a lateral incident face of the light guide plate enter the light guide plate, due to the backlight module getting thinner and the side frame becoming narrower.

To settle the aforementioned problem, the present invention provides a backlight module, comprising a light guide plate and a light source, where the light guide plate comprises a lateral incident face, an exit face that joins the lateral incident face, and an underside that corresponds to the exit face. The light source comprises an emitting surface, is disposed near one side of the lateral incident face of the light guide plate, and corresponds to the lateral incident face of the light guide plate with its emitting surface.

The backlight module further comprises diffusion strips, where the diffusion strips each is disposed in between a lateral incident face of the light guide plate and the emitting surface of a light source, and the light rays emitted from the emitting surface of the light source pass the diffusion strip and diffuse into the light guide plate.

In the backlight module of the present invention, the diffusion strip is provided with through holes, where the locations of the through holes each corresponds to the location between adjacent light emitting diodes (LED) of the light source.

In the backlight module of this invention, the longitudinal direction of the diffusion strip is perpendicular to the longitudinal direction of the light guide plate, and the diffusion strip is provided with at least two through holes, where the through holes are placed sequentially along the longitudinal direction of the diffusion strip.

In the backlight module of this invention, the backlight module further comprises a diffusion plate, where the diffusion plate is located on the light guide plate, the light guide plate and the diffusion plate are planar, and the diffusion plate is disposed directly on the light guide plate;

The diffusion strips connect to the diffusion plate and both are shaped into one piece, and the diffusion strips are formed by bending the two lateral ends of the diffusion plate downward followed by an extension.

In the backlight module of this invention, the backlight module further comprises fixation bars, where the fixation bars and the diffusion plate are located at top and bottom of the light guide plate respectively.

The fixation bar joins the nearby diffusion strip and both are shaped into one piece, and the fixation bars are formed by bending the bottom ends of the diffusion strips inward horizontally followed by an extension.

In the backlight module of this invention, the longitudinal direction of the fixation bar is parallel to the longitudinal direction of the diffusion strips.

In the backlight module of this invention, the backlight module further comprises a reflective plate, where the reflective plate is disposed in between the light guide plate and the fixation bar.

In the backlight module of this invention, the backlight module further comprises an optical film, where the optical film is disposed in between the light guide plate and the diffusion plate.

In the backlight module of this invention, the backlight module further comprises a back bezel, a rubber frame and a front frame, and the light sources are disposed on the back bezel, where the back bezel connects supportively to the reflective plate, the rubber frame connects to the back bezel, and the front frame connects to the rubber frame.

The other objective of this invention is to provide a liquid crystal display, to settle the technical problem of the bright spots that are easily brought about, as the light rays of a light bar near one side of the lateral incident face of the light guide plate enter the light guide plate, due to the backlight module getting thinner and the side frame becoming narrower.

To settle the aforementioned problem, the present invention provides a liquid crystal display, comprising a liquid crystal display panel, where the liquid crystal display panel extends horizontally, characterized in that: the liquid crystal display further comprises a backlight module of this invention. The liquid crystal display panel joins the backlight module, where the light rays emitted from the backlight module enter the liquid crystal display panel; wherein the backlight module comprises:

a light guide plate and a light source, where the light guide plate comprises a lateral incident face, an exit face that joins the lateral incident face, and an underside that corresponds to the exit face. The light source comprises an emitting surface, is disposed near one side of a lateral incident face of the light guide plate, and corresponds to the lateral incident face of the light guide plate with its emitting surface; wherein the backlight module further comprises diffusion strips, and the diffusion strips each is disposed in between a lateral incident face of the light guide plate and the emitting surface of a light source. The light rays emitted from the emitting surface of the light source pass the diffusion strip and diffuse into the light guide plate;

Relative to the conventional techniques, this invention has settled the technical problem of the bright spots that are easily brought about, as the light rays of light bar near one side of a lateral incident face of the light guide plate enter the light guide plate, due to the backlight module getting thinner and the side frame becoming narrower, which substantially boosts the quality of display frame.

To have a better comprehension on the aforementioned contents, the following description is detailed described with reference to the following preferred embodiments and the accompanying drawings.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

The following embodiments are described with reference to the following accompanying drawings, to exemplify the realization of this invention.

Figure 1A:
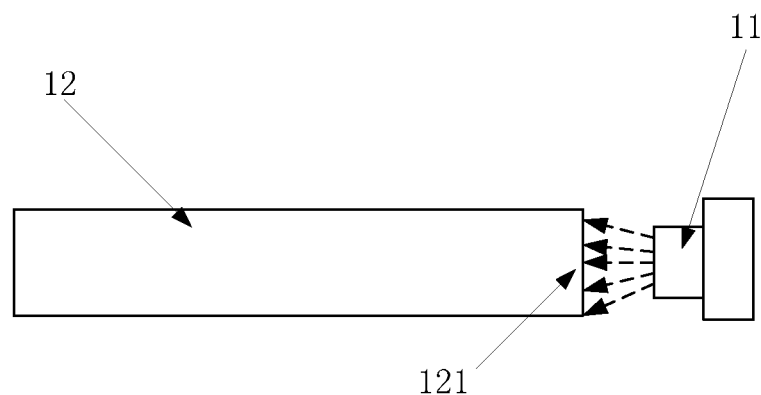
FIGS. 1A-1B are schematic diagrams of partial structure of the backlight module of the prior art.
Figure 1B:
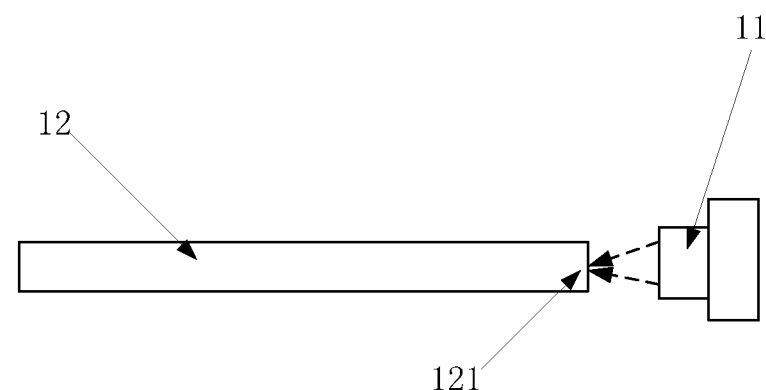
Figure 2:
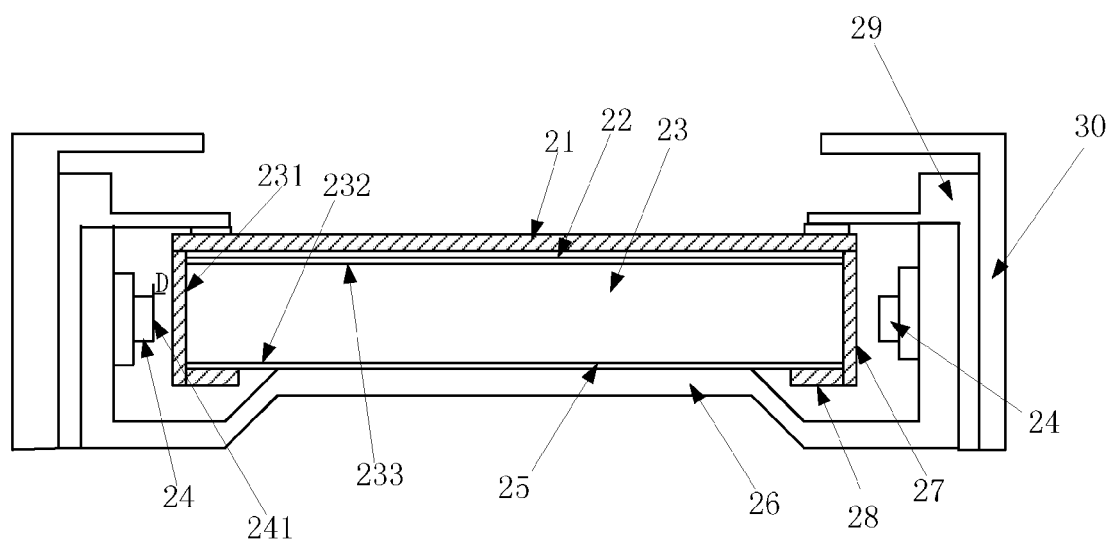
FIG. 2 is a sectional view of a preferred embodiment of the backlight module of this invention.

FIG. 2 is a sectional view of a preferred embodiment of the backlight module of this invention.

The backlight module comprises: a diffusion plate 21, an optical film 22, a light guide plate 23, light sources 24, a reflective plate 25, a back bezel 26, diffusion strips 27, fixation bars 28, a rubber frame 29 and a front frame 30.

Referring to FIG. 2, the diffusion plate 21, the optical film 22, the light guide plate 23 and the reflective plate 25 are planar in shape.

The diffusion plate 21 is disposed directly on the light guide plate 23, and the optical film 22 is disposed in between the diffusion plate 21 and the light guide plate 23. The light guide plate 23 is disposed in between the fixation bar 28 and the diffusion plate 21. The reflective plate 25 is disposed in between the light guide plate 23 and the fixation bar 28.

Referring to FIG. 2, the light source 24 is disposed on the back bezel 26, and the light source 24 comprises plural LEDs, where the encapsulating resin of each LED is provided with an emitting surface 241, and the back bezel 26 is supportively connected to the reflective plate 25. The rubber frame 29 joins the back bezel 26, and the front frame 30 joins the rubber frame 29.

Referring to FIG. 2, the light guide plate 23 comprises: lateral incident faces 231, an underside 232 and an exit face 233, where the exit face 233 connects to the lateral incident faces 231, and the underside 232 is opposite to the exit face 233. The light sources 24 each is disposed near one side of the lateral incident face 231 of the light guide plate 23, where the emitting surface 241 of the light source 24 corresponds to the lateral incident face 231 of the light guide plate 23, and the emitting surface 241 of the light source 24 and the lateral incident face 231 of the light guide plate 23 are placed with a preset distance D in between. The optical film 22 is disposed on the side of the exit face 233 of the light guide plate 23. The reflective plate 25 is disposed on the side of the underside 232 of the light guide plate 23.

Referring to FIG. 2, the diffusion strips 27 each is disposed in between the light source 24 and the light guide plate 23; more specifically, the diffusion strip 27 is disposed in between the lateral incident face 231 of the light guide plate 23 and the emitting surface 241 of the light source 24. The diffusion strips 27 are used to diffuse the light rays emitted from the emitting surface 241 of the light source 24 uniformly before the rays enter the light guide plate 23.

Figure 3:
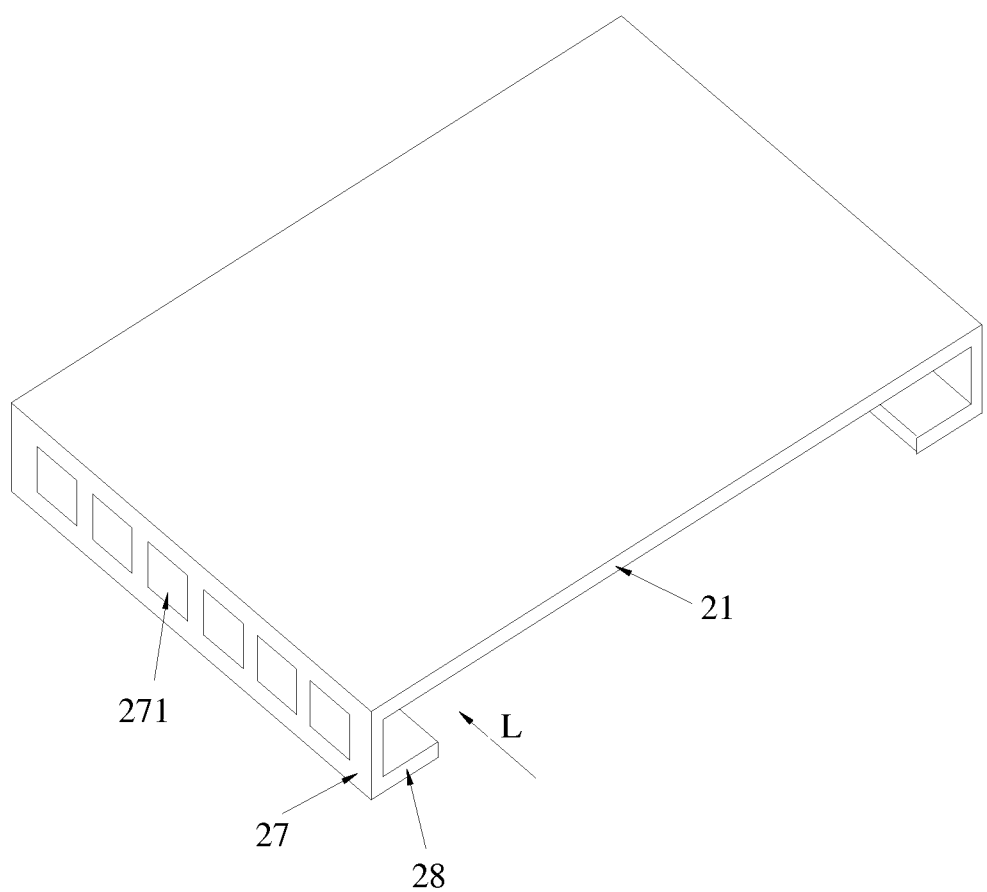
FIG. 3 is a schematic diagram of the structure of an one-piece shaping integrated by a diffusion plate, diffusion strips and fixation bars of this invention.

In the embodiment shown in FIG. 2, the diffusion plate 21 is disposed on the light guide plate 23, and the longitudinal direction of the diffusion strip 27 is perpendicular to the longitudinal direction of the light guide plate 23, the diffusion strips 27 join the diffusion plate 21 and the diffusion strips 27 and the diffusion plate 21 are shaped into one piece (referring to FIG. 3). The diffusion strips 27 are formed by bending the two lateral ends downward with an extension. Of course, the diffusion strip 27 can be formed into other structures, for instance, an independent piece of plate, provided that the light rays of the light sources 24 enter the light guide plate 23 uniformly, and no enumeration hereto.

Referring to FIG. 3, the longitudinal direction L of the fixation bar 28 is parallel to the longitudinal direction of the diffusion strip 27, where the fixation bars 28 joins the diffusion strips 27 respectively and the fixation bars 28, and the diffusion strips 27 are shaped into one piece and further shaped into one piece with the diffusion plate 21. The fixation bars 28 are formed by bending the bottom ends of the diffusion strips 27 inward horizontally with an extension. Referring to FIG. 2, the fixation bars 28 fix the optical film 22 in between the diffusion plate 21 and the light guide plate 23, and meanwhile the reflective plate 25 is connected to the light guide plate 23.

Referring to FIG. 3, the diffusion strips 27 are provided with through holes 271, where the positions of the through holes 271 correspond to the locations between adjacent LEDs of the light source 24 respectively, and the locations between adjacent through holes 271 of the diffusion strips 27 function to diffuse the light rays emitted from the light source 24 to enter the light guide plate 23.

In the embodiment shown in FIG. 3, the diffusion strip 27 comprises at least two through holes 271, and the minimum of two through holes 271 are placed along the longitudinal direction of the diffusion strip 27. The structure with plural through holes 271 in series makes the diffusion of the light rays of the light source 24 into the light guide plate 23 even better.

The working principle of a preferred embodiment of the backlight module of this invention is as follows:

Referring to FIGS. 2 and 3, during passing the backlight module for illumination, the light rays from the emitting surface 241 of the light source 24 pass the portions between adjacent through holes of the diffusion strips 27 for light diffusion and uniformly enter the light guide plate 23.

For those light rays entered the light guide plate 23, one portion of the light rays emits from the exit face 233 of the light guide plane 23, passes the optical film 22 and diffuse into a liquid crystal display (not shown in the figure) by the diffusion plate 21 while the other portion of the light rays emits from the underside 232 of the light guide plate 23. However, the light rays emitted from the underside 232 of the light guide plate 23 are reflected by the reflective plate 25 into the light guide plate 23, pass the optical film 22 and diffuse into the liquid crystal display by the diffusion plate 21.

The light rays diffused by the diffusion strips 27 enter the light guide plate 23 uniformly; therefore, even the backlight module becomes thinner and the side frame becomes narrower, the backlight bright spots near one side of the lateral incident face 231 of the light guide plate 23 can be eliminated, which substantially boosts the light emitting of the backlight module, and further lifts the display quality of the liquid crystal display.

Since the fixation bars 28, the diffusion strips 27 and the diffusion plate 21 are shaped into one piece with a bending structure, which is available to hold the optical film 22 fixedly between the diffusion plate 21 and the light guide plate 23, and to connect the reflective plate 25 to the light guide plate 23 directly.

Figure 4:
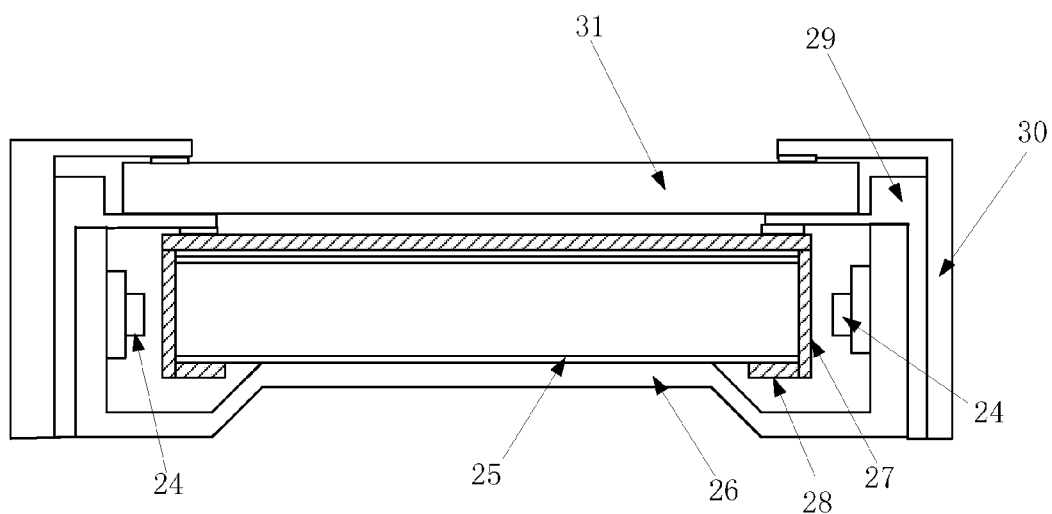
FIG. 4 is a sectional view of a preferred embodiment of the liquid crystal display of this invention.

This invention further provides a liquid crystal display, shown in FIG. 4, where the liquid crystal display comprises a liquid crystal display panel 31 and a backlight module provided by this invention. Referring also to FIG. 2, the light rays from the backlight module enter the liquid crystal display panel 31. Since the backlight module and its working principle are already described in detail in the above contexts, there is no iteration hereto.

In conclusion, the preferred embodiments of this invention are disclosed above; however, the aforesaid exemplified embodiments of the present invention are used not for the constraint of the scope; any equivalent modifications, made by those with common knowledge in the field of the present invention, without departing from the spirit and scope of the present invention are therefore intended to be embraced. The present invention is intended to be limited only by the scope of the appended claims.

The invention claimed is:

1. A backlight module, comprising a light guide plate and light sources, where said light guide plate comprises lateral incident faces, an exit face that joins the lateral incident faces, and an underside that corresponds to the exit face; said light sources each comprising an emitting surface, being disposed near one side of one lateral incident face of said light guide plate, and corresponding to the lateral incident face of said light guide plate with the emitting surface, characterized in that:

the backlight module further comprises diffusion strips, where the diffusion strips each is disposed in between one lateral incident face of said light guide plate and the emitting surface of said light source, and the diffusion strip being provided with through holes, where the locations of the through holes correspond to the locations between adjacent light emitting diodes of said light source, and the light rays emitted from the emitting surface of said light source passing the through holes of the diffusion strip and diffusing into said light guide plate;

wherein the backlight module further comprises a diffusion plate, where the diffusion plate is located on said light guide plate, said light guide plate and the diffusion plate being planar, and the diffusion plate being disposed directly on said light guide plate;

wherein the diffusion strips connect to the diffusion plate, the diffusion strips and the diffusion plate are shaped into one piece, and the diffusion strips are formed by bending the two lateral ends of the diffusion plate downward followed by an extension.

2. A backlight module as in claim 1, characterized in that: the longitudinal direction of the diffusion strip is perpendicular to the longitudinal direction of said light guide plate, and the diffusion strip being provided with at least two through holes, where the through holes are placed sequentially along the longitudinal direction of the diffusion strip.

3. A backlight module as in claim 1, characterized in that: the backlight module further comprises fixation bars, where the fixation bars and the diffusion plate are located at top and bottom of said light guide plate respectively;

the fixation bars each joins the nearby diffusion strip and both are shaped into one piece, and the fixation bars being formed by bending the bottom ends of the diffusion strips inward horizontally followed by an extension.

4. A backlight module as in claim 3, characterized in that: the longitudinal direction of the fixation bar is parallel to the longitudinal direction of the diffusion strip.

5. A backlight module as in claim 3, characterized in that: the backlight module further comprises a reflective plate, where the reflective plate is disposed in between said light guide plate and the fixation bar.

6. A backlight module as in claim 3, characterized in that: the backlight module further comprises an optical film, where the optical film is disposed in between said light guide plate and the diffusion plate.

7. A backlight module as in claim 1, characterized in that: the backlight module further comprises a back bezel, a rubber frame and a front frame, and said light sources being disposed on the back bezel, where the back bezel connects supportively to the reflective plate, the rubber frame connects to the back bezel, and the front frame connects to the rubber frame.

8. A backlight module, comprising a light guide plate and light sources, where said light guide plate comprises lateral incident faces, an exit face that joins the lateral incident faces, and an underside that corresponds to the exit face; said light sources each comprising an emitting surface, being disposed near one side of one lateral incident face of said light guide plate, and corresponding to the lateral incident face of said light guide plate with the emitting surface, characterized in that:
the backlight module further comprises diffusion strips, where the diffusion strips each is disposed in between one lateral incident face of said light guide plate and the emitting surface of said light source, and the light rays emitted from the emitting surface of said light source passing the diffusion strip and diffusing into said light guide plate;
the diffusion strip is provided with through holes, where the locations of the through holes correspond to the locations between adjacent light emitting diodes of said light source respectively, wherein the light rays emitted from the emitting surface of said light source pass the through holes of the diffusion strip and diffuse into said light guide plate;
the longitudinal direction of the diffusion strip is perpendicular to the longitudinal direction of said light guide plate, and the diffusion strip being provided with at least two through holes, where the through holes are placed sequentially along the longitudinal direction of the diffusion strip;
the backlight module further comprises a diffusion plate, where the diffusion plate is located on said light guide plate, said light guide plate and the diffusion plate being planar, and the diffusion plate being disposed directly on said light guide plate;
the diffusion strips connect to the diffusion plate, the diffusion strips and the diffusion plate are shaped into one piece, and the diffusion strips are formed by bending two lateral ends of the diffusion plate downward followed by an extension; and
the backlight module further comprises fixation bars, where the fixation bars and the diffusion plate are located at top and bottom of said light guide plate respectively; the fixation bars each joins the nearby diffusion strip and both are shaped into one piece, and the fixation bars being formed by bending bottom ends of the diffusion strips inward horizontally followed by an extension.

9. A backlight module as in claim 8, characterized in that: the longitudinal direction of the fixation bar is parallel to the longitudinal direction of the diffusion strip.

10. A backlight module as in claim 8, characterized in that: the backlight module further comprises a reflective plate, where the reflective plate is disposed in between said light guide plate and the fixation bar.

11. A backlight module as in claim 8, characterized in that: the backlight module further comprises an optical film, where the optical film is disposed in between said light guide plate and the diffusion plate.

12. A backlight module as in claim 10, characterized in that: the backlight module further comprises a back bezel, a rubber frame and a front frame, and said light sources being disposed on the back bezel, where the back bezel connects supportively to the reflective plate, the rubber frame connects to the back bezel, and the front frame connects to the rubber frame.

13. A liquid crystal display, comprising a liquid crystal display panel, where the liquid crystal display panel is planar, characterized in that: the liquid crystal display further comprises a backlight module, and the liquid crystal display panel joining the backlight module, where the light rays emitted from the backlight module enter the liquid crystal display panel; wherein the backlight module comprises:
a light guide plate and light sources, where said light guide plate comprises lateral incident faces, an exit face that joins the lateral incident faces, and an underside that corresponds to the exit face; said light sources each comprising an emitting surface, being disposed near one side of one lateral incident face of said light guide plate, and corresponding to the lateral incident face of said light guide plate with the emitting surface; the backlight module further comprising diffusion strips, where the diffusion strips each is disposed in between one lateral incident face of said light guide plate and the emitting surface of said light source, and the light rays emitted from the emitting surface of said light source passing the diffusion strip and diffusing into said light guide plate;
the diffusion strip is provided with through holes, where the locations of the through holes correspond to the locations between adjacent light emitting diodes of said light source respectively, wherein the light rays emitted from the emitting surface of said light source pass the through holes of the diffusion strip and diffuse into said light guide plate;
the longitudinal direction of the diffusion strip is perpendicular to the longitudinal direction of said light guide plate, and the diffusion strip being provided with at least two through holes, where the through holes are placed sequentially along the longitudinal direction of the diffusion strip;
the backlight module further comprises a diffusion plate, where the diffusion plate is located on said light guide plate, said light guide plate and the diffusion plate being planar, and the diffusion plate being disposed directly on said light guide plate;
the diffusion strips connect to the diffusion plate, the diffusion strips and the diffusion plate are shaped into one piece, and the diffusion strips are formed by bending two lateral ends of the diffusion plate downward followed by an extension; and
the backlight module further comprises fixation bars, where the fixation bars and the diffusion plate are located at top and bottom of said light guide plate respectively; the fixation bars each joins the nearby diffusion strip and both are shaped into one piece, and the fixation bars being formed by bending bottom ends of the diffusion strips inward horizontally followed by an extension.

\* \* \* \* \*